United States Patent Office 3,313,751
Patented Apr. 11, 1967

3,313,751
THERMOPLASTIC RESINS
Lester A. H. Baum, Carteret, N.J., and Paul F. Bruins, Douglaston, and Francis W. Littler, Mineola, N.Y., assignors to Mobil Oil Corporation, a corporation of New York
No Drawing. Filed June 24, 1963, Ser. No. 290,163
4 Claims. (Cl. 260—17.4)

This invention relates to new and useful thermoplastic resins. In one of its aspects, the invention relates to new and useful thermoplastic resins obtained from hydrocarbon mixtures containing butadiene. In another aspect, the invention relates to a method for preparing the aforementioned thermoplastic resins obtained from hydrocarbon mixtures containing butadiene. As used in the present description and claims, the term butadiene is intended to refer to the compound, butadiene 1,3.

It has heretofore, been the practice to recover butadiene from hydrocarbon mixtures comprising, for the most part, varying amounts of $C_4$ hydrocarbons, and in which lesser amounts of $C_3$ and lower molecular weight, or $C_5$ and higher molecular weight, hydrocarbon compounds may also be present. For this purpose, well-known processes have been employed involving the extractive distillation with solvents such as furfural, to recover butadiene from the aforementioned hydrocarbon mixtures. In general, such processes comprise subjecting a butadiene-containing hydrocarbon mixture comprising $C_4$ hydrocarbons (and which may also include higher and lower boiling hydrocarbons) to extractive distillation with furfural, as a solvent, to produce an extract phase comprising furfural, butadiene and hydrocarbons having a relatively high degree of unsaturation (e.g., acetylenes), and a raffinate phase comprising relatively lower boiling hydrocarbons, such as butane or butenes. The separated extract phase is next subjected to a stripping operation in which butadiene is recovered as an overhead fraction, while furfural and, for the most part, $C_4$ and higher boiling hydrocarbons are removed as a relatively high boiling fraction. A portion of this high boiling fraction is recycled to the initial extraction tower. From the remaining portion, furfural is removed by steam distillation as a relatively low boiling fraction, while the residue, comprising a mixture of furfural and, for the most part, $C_4$ and higher boiling hydrocarbons and water is recovered as a relatively high boiling fraction. This residue, having had no practical commercial utility, has heretofore been discarded. It is with respect to the treatment of this residue, however, that the present invention is concerned, for the purpose of forming new and useful materials.

It is, therefore, an object of the present invention to provide new and useful materials from the residue obtained from the aforementioned extractive distillation of hydrocarbon mixtures containing butadiene.

Another object of the invention is to provide new and useful materials from the residue obtained from the aforementioned extractive distillation of hydrocarbon mixtures containing butadiene, employing furfural as a selective extraction agent.

Still another object of the invention is to provide a new and improved method for obtaining useful materials from the aforementioned extractive distillation of hydrocarbon mixtures containing butadiene.

Other objects and advantages inherent in the invention will become apparent to those skilled in the art from the following description.

The aforementioned objects are accomplished by the process, more fully hereinafter discussed, which comprises subjecting the aforementioned residue, formed during the extractive distillation of hydrocarbon mixtures containing butadiene, to a polymerization treatment in which a solid thermoplastic resin is formed and which possess a controllable softening point. This thermoplastic resin is found to have outstanding properties making it particularly suitable as a binder or adhesive. Thus, this resinous material has specific utility as a binder for fiber board; as a modifier for use in the manufacture of grease-resistant asphalt tile, by reason of its high degree of resistance to various solvents; as a resin which may be subjected to molding operations, either alone or in combination with various filler materials for producing useful shaped articles of commercial utility; or, when dissolved in a suitable vehicle, as a protective coating for various materials. In addition, the improved resinous material may be employed in combination with other polymeric materials to modify or enhance their properties, thereby increasing their field of useful industrial application.

In accordance with the improved method of the present invention, the polymerization treatment of the aforementioned residue is carried out at a temperature between about 350° F. and about 500° F., and, preferably, at a temperature between about 350° F. and about 400° F. Where the polymerization treatment is carried out at temperatures from about 350° F. to about 500° F., the finished thermoplastic resinous material is found to have a softening point (ball and ring) of between about 210° F. and about 300° F. Where the polymerization treatment is carried out at temperatures from about 350° F. to about 400° F., the finished thermoplastic resinous material is found to have a softening point (ball and ring) of between about 220° F. and about 250° F. The softening point is controllable, in this respect, by concomitant adjustment of polymerization temperatures within the aforementioned ranges. With respect to the aforementioned temperature requirements for carrying out the polymerization treatment, it is found that if the treatment is carried out below approximately 350° F., polymerization of the aforementioned residue is difficult to attain even after prolonged heat treatment, as is evident from its relatively low softening point. On the other hand, when temperatures above approximately 500° F. are employed, the resulting material, although polymerized, is not thermoplastic in nature, but hard, brittle and unsuitable for use as a binder, adhesive or as a protective coating, even when it is attempted to dissolve this material in various solvents. It should be noted that the aforementioned polymerization treatment may be carried out at either atmospheric, subatmospheric or elevated pressures, with suitable adjustment, within the aforementioned indicated ranges of the polymerization temperature.

The following examples will serve to illustrate the preparation of the aforementioned novel and improved thermoplastic resins of the present invention, and to demonstrate their utility and effectiveness, as evidenced by the respective softening point data obtained.

*Example 1.*—20 lbs. of a furfural-butadiene residue, obtained in accordance with the process previously described, and containing approximately 50 percent water, by weight, was brought to a temperature of 130° F., and then slowly heated to 215° F. to evaporate the water without foaming. This dehydrated residue was subjected to polymerization by subsequent heat treatment at temperatures gradually increasing to 350° F. as shown in the following table.

TABLE I

| Cumulative, time/hrs. | Heating Temperature, ° F. | Softening Point, ° F. (Ball and Ring) |
|---|---|---|
| 1 | 200–300 | 130 |
| 6 | 300 | 142 |
| 9 | 350 | 154 |
| 11.5 | 350 | 177 |
| 13 | 350 | 190 |
| 15 | 350 | 199 |
| 16 | 350 | 202 |
| 20 | 350 | 206 |
| 21 | 350 | 215 |

From the foregoing table of Example 1, it will be noted that a softening point within the aforementioned range, viz, of at least about 210° F. was obtained with this particular furfural-butadiene residue only after a heat treatment period of more than 20 hours.

*Example 2.*—20 lbs. of a furfural-butadiene residue, obtained in accordance with the process previously described, and containing approximately 50 percent water, by weight, was brought to a temperature of 130° F., and then slowly heated to 215° F. to evaporate the water without foaming. This dehydrated residue was then subjected to polymerization by subsequent heat treatment at temperatures gradually increasing to 350° F. as shown in the following table.

TABLE II

| Cumulative, time/hrs. | Heating Temperature, ° F. | Softening Point, ° F. (Ball and Ring) |
|---|---|---|
| 2 | 300 | 118 |
| 8 | 350 | 173 |
| 11 | 350 | 191 |
| 12 | 350 | 206 |
| 14 | 350 | 228 |

From the foregoing table of Example 2, it will be noted that a softening point within the aforementioned range viz. of at least about 210° F. was obtained with this particular furfural-butadiene residue only after a heat treatment of more than 12 hours.

*Example 3.*—The procedure described in Examples 1 and 2 was repeated, except that the dehydrated residue was subjected to polymerization by subsequent heat treatment at temperatures gradually increasing to 370° F., during a cumulative time of 6 hours. At the end of this period, a softening point of about 226° F., was obtained with the particular furfural-butadiene residue treated.

*Example 4.*—The procedure described in Examples 1, 2 and 3 was repeated, except that the dehydrated residue was subjected to polymerization by subsequent heat treatment at temperatures gradually increasing to 440° F. during a cumulative time of 6 hours. At the end of this period, a softening point of about 214° F. was obtained with the particular furfural-butadiene residue treated.

*Example 5.*—The procedure described in Examples 1, 2, 3 and 4 was repeated, except that the dehydrated residue, obtained from a different source, was subjected to polymerization by subsequent heat treatment at temperatures gradually increasing to 350° F. during a cumulative time of 4½ hours. At the end of this period, a softening point of about 294° F. was obtained with this particular furfural-butadiene residue treated.

The following examples, as shown in Table III, illustrate the properties of several thermoplastic resin compositions, containing the aforementioned polymerized furfural-butadiene residue, in percent by weight, prepared in the manner previously described and more specifically set forth in several of the above examples, and suitable for use as fiber board binders.

TABLE III

| | Composition | | |
|---|---|---|---|
| | Example 6 | Example 7 | Example 8 |
| | Polymerized furfural-butadiene residue, 100% | Polymerized furfural-butadiene residue, 75%; Thermally cracked asphalt, 25% | Polymerized furfural-butadiene residue, 75%; Rosin by-product,[1] 25% |
| Specific Gravity at 77/77° F | 1.214 | 1.236 | 1.197 |
| Softening Point, ° F. (Ball and Ring) | 225 | 222 | 245 |
| Solubility in Carbon Tetrachloride, percent | 56.72 | 64.42 | 35.87 |
| Solubility in Carbon Disulfide, percent | 57.30 | 67.17 | 37.45 |
| Pentration, 100 g./5 sec.: | | | |
| At 115° F | 4 | | |
| At 130° F | 8 | 8 | 2 |
| At 140° F | 12 | 15 | 4 |
| At 150° F | 15 | 19 | 5 |
| At 160° F | | 27 | 7 |
| Visc. Furol, Seconds at 350° F | | 706 | 3,001 |

[1] Obtained during purification of rosin derived from treatment of pine woods.

The compositions of Examples 6, 7 and 8 of Table III containing the aforementioned polymerized furfural-butadiene residues, were next individually incorporated as binders into fabricated fiber boards. In each instance, the compositions of Examples 6, 7 and 8 were each separately pulverized to a fine powder, and 42 grams of this powder were added to a dispersion of 528 grams of exploded wood fiber, dispersed in 8100 cc. of water. After making allowance for the moisture content of the exploded wood fiber, the ratio of the thermoplastic resinous binder to the dry fiber was found to be 1:3. The dispersion was then heated to 140° F. and maintained at this temperature for a period of 15 minutes. The thus-heated dispersion was then formed into an eight inch square board, in each instance, over a suction screen, and then pressed at a total pressure of 1500 pounds, in order to squeeze out as much water as possible. The board was then baked, in each instance, at a temperature of 315° F. for a period of 3 hours. The boards those produced were found to have the properties shown in Table IV, with the binder content of the board, expressed in percent by weight.

TABLE IV

|  | Example 9 | Example 10 | Example 11 |
|---|---|---|---|
| Composition of Board: | | | |
| Composition of Example 6, percent | 25 | | |
| Composition of Example 7, percent | | 25 | |
| Composition of Example 8, percent | | | 25 |
| Nail Pull 3" x 6": | | | |
| Thickness (inches) | 0.549 | 0.545 | 0.563 |
| Density (lbs./cu. ft.) | 22.9 | 23.9 | 23.5 |
| Actual | 28.2 | 36.6 | 41.3 |
| Water Absorption (6" x 6"): | | | |
| Density Orig. (lbs./cu. ft.) | 23.6 | 23.4 | 24.6 |
| Thickness Orig. (inches) | 0.537 | 0.550 | 0.527 |
| Increased Thickness, 24 hours, percent | 7.2 | 7.4 | 8.1 |
| Normal Moisture, Wt. percent | 2.8 | 2.9 | 3.5 |
| Water Absorption in 2 hrs., wt. percent | 7.9 | 7.1 | 7.3 |
| Water Absorption in 24 hrs., wt. percent | 29.0 | 26.4 | 28.6 |
| Modulus of Rupture (6" Span): | | | |
| Density, lbs./cu. ft. | 23.3 | 22.6 | 23.0 |
| Thickness (inches) | 0.539 | 0.563 | 0.543 |
| Modulus, p.s.i. | 1,202 | 1,116 | 1,106 |
| Paintability | Good | Good | Good |

As will be seen from the examples of Table IV, above, the improved thermoplastic resins of the present invention possess outstanding utility, in one of their applications, as binders in the manufacture of fiber board, and may be used for this purpose in varying amounts and in combination with other ingredients. As will also be seen from the examples of Table IV, fiber board thus produced can be painted without bleed-through of the binder material. On the other hand, if asphalt, alone, were employed, the solvent employed in conjunction therewith, would attack the asphalt and bleed-through to the surface. It will also be noted that by controlling the polymerization temperature, the softening point of the finished material can also be controlled, depending in each instance upon the nature of the material being polymerized.

As was indicated above, another field of application for the improved thermoplastic resins of the present invention is the manufacture of grease-resistant asphalt tile. In the conventional manufacture of asphalt tile, it is customary to employ, for example, formulations comprising Gilsonite and various hydrocarbon resins. Such resins, however, have been found not to be resistant to many solvents, and thus have made it difficult to manufacture so-called "greaseproof" tile. It has now been found, however, that by substituting the improved thermoplastic resins of the present invention for those heretofore incorporated in asphalt tile formulations, grease-resistant tile can now be obtained. In this respect, the following data is indicative of the high degree of resistance to various solvents exhibited by the improved thermoplastic resins of the present invention.

Polymerized furfural-butadiene resin:
  Softening point (ball and ring) °F __ 225
  Penetration at 115° F./100 gms./5 secs. _____ 4
  Color (Barrett—methyl ethyl ketone) _____ 17
  Solubility in mineral spirits _____ Slight
  Solubility in methyl alcohol _____ Very slight
  Solubility in xylene _____ Partial
  Solubility in methyl ethyl ketone, percent (wt.) __ 88

While preferred embodiments of the novel compositions of the present invention, and the method for their preparation, have been described for purposes of illustration, it will be understood that various modifications and adaptations thereof, which will be obvious to those skilled in the art, may be made without departing from the spirit of the invention.

We claim:
1. A method for forming a thermoplastic resin which comprises: heating the residue formed during the furfural extractive distillation of hydrocaron mixtures containing butadiene and comprising a mixture of $C_4$ and higher boiling hydrocarbons and water to a temperature not higher than about 215° F. to evaporate water therefrom; and thereafter subjecting the thus dehydrated residue to polymerization at a temperature between about 350° F. and about 500° F.

2. A method as defined by claim 1 in which said polymerization is carried out at a temperature between about 350° F. and about 400° F.

3. The thermoplastic resin produced in accordance with the method of claim 1.

4. Fiberboard comprising exploded wood-fiber containing as a binder the thermoplastic resin produced in accordance with the method of claim 1.

References Cited by the Examiner

UNITED STATES PATENTS

| 2,758,988 | 8/1956 | Banes et al. | 260—82 |
| 2,817,647 | 12/1957 | Habeshaw et al. | 260—82 |
| 2,894,937 | 7/1959 | Banes et al. | 260—82 |

MORRIS LIEBMAN, *Primary Examiner.*

ALLAN LIEBERMAN, *Assistant Examiner.*